US011780188B2

(12) United States Patent
Hirabayashi et al.

(10) Patent No.: US 11,780,188 B2
(45) Date of Patent: Oct. 10, 2023

(54) PREFORM SHAPING APPARATUS

(71) Applicant: SUBARU CORPORATION, Tokyo (JP)

(72) Inventors: Daisuke Hirabayashi, Tokyo (JP); Shun Honda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 255 days.

(21) Appl. No.: 16/808,797

(22) Filed: Mar. 4, 2020

(65) Prior Publication Data

US 2020/0198185 A1 Jun. 25, 2020

Related U.S. Application Data

(63) Continuation of application No. PCT/JP2018/014953, filed on Apr. 9, 2018.

(30) Foreign Application Priority Data

Sep. 6, 2017 (JP) ................................ 2017-171354

(51) Int. Cl.
*B30B 5/02* (2006.01)
*B29B 11/12* (2006.01)
(Continued)

(52) U.S. Cl.
CPC ................ *B30B 5/02* (2013.01); *B29B 11/12* (2013.01); *B29B 11/16* (2013.01);
(Continued)

(58) Field of Classification Search
CPC ......... B29B 11/12; B29B 11/16; B29C 65/62; B29C 43/3642; B29C 43/56; B29C 70/48; B29C 2043/3649; B29C 2043/56
See application file for complete search history.

(56) References Cited

U.S. PATENT DOCUMENTS 5,648,109 A * 7/1997 Gutowski ................. B30B 5/02
425/389
5,882,462 A * 3/1999 Donecker ................ B27N 3/10
264/137
(Continued)

FOREIGN PATENT DOCUMENTS

JP H11-099993 A 4/1999
JP 2004-322442 A 11/2004
(Continued)

OTHER PUBLICATIONS

English Translation of JP2011161976 (Year: 2011).*
(Continued)

*Primary Examiner* — Matthew J Daniels
*Assistant Examiner* — Hana C Page
(74) *Attorney, Agent, or Firm* — Smith, Gambrell & Russell, LLP

(57) ABSTRACT

According to one implementation, a preform shaping apparatus includes a rigid mold and a pressurizing jig. The rigid mold has a shape corresponding to a shape of a preform which has been shaped. The pressurizing jig presses an unshaped material of the preform to the rigid mold at different positions and different timings. Further, according to one implementation, a method of shaping a preform includes: producing the shaped preform by pressing an unshaped material of the preform to a rigid mold at different positions and different timings; and using a pressurizing jig for pressing the material. The rigid mold has a shape corresponding to a shape of the preform. The pressurizing jig is adapted to apply pressures on the material at the different positions and the different timings.

19 Claims, 10 Drawing Sheets

(51) Int. Cl.
*B29B 11/16* (2006.01)
*B29C 43/36* (2006.01)
*B29C 43/56* (2006.01)
*B29C 70/48* (2006.01)
*B29C 70/46* (2006.01)
*B29C 70/54* (2006.01)
*B29K 105/08* (2006.01)

(52) U.S. Cl.
CPC .......... *B29C 43/3642* (2013.01); *B29C 43/56* (2013.01); *B29C 70/461* (2021.05); *B29C 70/48* (2013.01); *B29C 70/549* (2021.05); *B29C 2043/3649* (2013.01); *B29C 2043/561* (2013.01); *B29K 2105/0872* (2013.01)

(56) References Cited

U.S. PATENT DOCUMENTS

| | | | |
|---|---|---|---|
| 9,914,268 B2 | 3/2018 | Coxon et al. | |
| 2006/0017200 A1 | 1/2006 | Cundiff et al. | |
| 2009/0091063 A1* | 4/2009 | Petersson | B29C 53/025 425/398 |
| 2010/0170631 A1* | 7/2010 | Kim | B29C 70/44 156/212 |
| 2014/0072775 A1* | 3/2014 | De Mattia | B32B 37/14 156/60 |
| 2014/0261993 A1* | 9/2014 | Samejima | B29C 43/3642 156/243 |
| 2015/0008619 A1 | 1/2015 | Maertiens | |
| 2016/0009379 A1* | 1/2016 | Witte | B29C 70/44 156/60 |
| 2017/0190078 A1* | 7/2017 | Witte | B29C 70/44 |
| 2019/0106194 A1 | 4/2019 | Tajiri et al. | |

FOREIGN PATENT DOCUMENTS

| | | |
|---|---|---|
| JP | 2006-123404 A | 5/2006 |
| JP | 2006-188791 A | 7/2006 |
| JP | 2010-126573 A | 6/2010 |
| JP | 2011-161976 A | 8/2011 |
| JP | 2015-231740 A | 12/2015 |
| WO | 2010/119995 A1 | 10/2010 |
| WO | 2019/049411 A1 | 3/2019 |

OTHER PUBLICATIONS

Hsiao ("Effect of carbon nanofiber z-threads on mode-I delamination toughness of carbon fiber reinforced plastic laminates," Composites Part A: Applied Science and Manufacturing, vol. 91, Part 1, 2016, pp. 324-335). (Year: 2016).*
European search report dated Apr. 30, 2021 in EP Patent Application No. 18 853 766.6 (7 pages).
Chinese Office Action dated Jan. 29, 2022 in Cn Patent Application No. 201880047183.9 (7 pages in Chinese with English translation).
Chinese Office Action dated Jun. 18, 2021 in Cn Patent Application No. 201880047183.9 (9 pages in Chinese with English translation).
Written Opinion for PCT/JP2018/014953 dated Jun. 19, 2018 (11 pages with English Translation).
Chinese Office Action dated May 18, 2022 in Cn Patent Application No. 201880047183.9 (6 pages in Chinese with English translation).
International Search Report for PCT/JP2018/014953 dated Jun. 19, 2018 (5 pages with English Translation).
Written Opinion for PCT/JP2018/014953 dated Jun. 19, 2018 (7 pages).

* cited by examiner

PREFORM SHAPING APPARATUS

CROSS REFERENCES TO RELATED APPLICATIONS

This is a continuation of Application PCT/JP2018/ 14953, filed on Apr. 9, 2018.

This application is based upon and claims the benefit of priority from Japanese Patent Application No. 2017-171354, filed on Sep. 6, 2017; the entire contents of which are incorporated herein by reference.

FIELD

Implementations described herein relate generally to a preform shaping apparatus, a method of shaping a preform and a method of producing a composite material structure.

BACKGROUND

A typical wing structural object of an aircraft has a structure in which reinforcing structural members, such as spars, ribs and stringers, have been disposed between an upper panel (skin) and a lower panel. Moreover, a structural member having a corrugated cross section is known as one of structural members which reinforce a wing structural object (for example, refer to Japanese Patent Application Publication JPH11-99993 A).

When a corrugated structural member is produced using a composite material, such as GFRP (glass fiber reinforced plastics) or CFRP (carbon fiber reinforced plastics), which is a resin reinforced with fibers, it is necessary to mold the composite material into a corrugated-shape.

Therefore, in order to mold a corrugated composite material, it is required to shape a laminated body of prepregs into a corrugated shape, or to shape a laminated body of fiber sheets into a corrugated shape. A laminated body of prepregs shaped according to a shape of a composite material, a laminated body of fibers which has not been impregnated with resin in an RTM method and a laminated body of fibers which has been impregnated with resin in an RTM method are each called a preform in the technical field of molding composite material. In particular, a laminated body of fibers which has not been impregnated with resin is called a dry preform.

Methods of shaping a corrugated preform include a method for laminating prepreg sheets on a shaping mold having corrugated concavity and convexity (for example, refer to Japanese Patent Application Publication JPH11-99993 A). In this case, the shaping mold can also be used as a mold for thermal forming. That is, a corrugated composite material can be molded by thermally curing a laminated body of prepregs laminated on a shaping mold by an autoclave apparatus or an oven.

As a method for molding a corrugated composite material, an RTM method can also be adopted (for example, refer to Japanese Patent Application Publication JPH11-99993 A). Specifically, a laminated body of fibers shaped into a corrugated shape in advance is placed between an upper mold and a lower mold each produced according to corrugated concavity and convexity. After that, thermosetting resin is injected and thermally cured. Thereby, a corrugated composite material can be molded. In this case, it is necessary to produce a dry preform shaped into a corrugated shape.

Methods of shaping a dry preform prior to molding a composite material include a method for laminating fibers on a shaping mold, and subsequently, heating the laminated fibers with a heater or the like (for example, refer to Japanese Patent Application Publication JP2006-123404 A). Moreover, a shaping method by heating fibers pressed on a shaping mold with bagging by vacuuming is also known (for example, refer to Japanese Patent Application Publication JP2010-126573 A).

However, when a dry preform having a complicated shape including concavity and convexity, such as a corrugated dry preform, is shaped, bagging may become difficult. Specifically, when fiber sheets laminated on a shaping mold having concavity and convexity are locally pressed on convex portions of the shaping mold by the atmospheric pressure, the fiber sheets are pulled to the both sides across each convex portion. As a result, the fibers are stretched, and thereby may not fit to concavity portions of the shaping mold. In this case, a cavity is generated in each corner of the concavity portions of the shaping mold, and thereby it becomes difficult to produce a preform having an intended shape.

Accordingly, an object of the present invention is to make it possible to produce a preform and a composite material having a complicated shape with satisfactory quality.

SUMMARY OF THE INVENTION

In general, according to one implementation, a preform shaping apparatus includes a rigid mold and a pressurizing jig. The rigid mold has a shape corresponding to a shape of a preform which has been shaped. The pressurizing jig presses an unshaped material of the preform to the rigid mold at different positions and different timing.

Further, according to one implementation, a method of shaping :a preform includes: producing the shaped preform by pressing an unshaped material of the preform to a rigid mold at different positions and different timing; and using a pressurizing jig for pressing the material. The rigid mold has a shape corresponding to a shape of the preform. The pressurizing jig is adapted to apply pressures on the material at the different positions and the different timing.

Further, according to one implementation, a method of producing a composite material includes: placing core jigs on a laminated body of prepregs for a panel and placing the corrugated dry preform, produced by the above-mentioned method, on the placed core jigs; impregnating the corrugated dry preform with uncured thermosetting resin by injecting the uncured thermosetting resin into an area sealed by a vacuum bag in a state where the corrugated dry preform placed on the core jigs has been bagged with the vacuum bag; and producing the composite material structure having the panel and a corrugated reinforcing member attached to the panel, by thermally curing the laminated body of the prepregs for the panel and the thermosetting resin with which the corrugated dry preform has been impregnated. The laminated body of the prepregs for the panel is placed on a lower rigid mold. The core jigs correspond to a shape of the corrugated dry preform.

Further, according to one implementation, a method of producing a composite material structure includes: molding a corrugated composite material; producing a panel made of another composite material; and producing the composite material structure having the panel and a corrugated reinforcing member attached to the panel, by assembling the corrugated composite material to the panel. The corrugated dry preform or the corrugated laminated body of the prepregs, produced by the above-mentioned method, is used as a material of the corrugated composite material.

Figure 8:
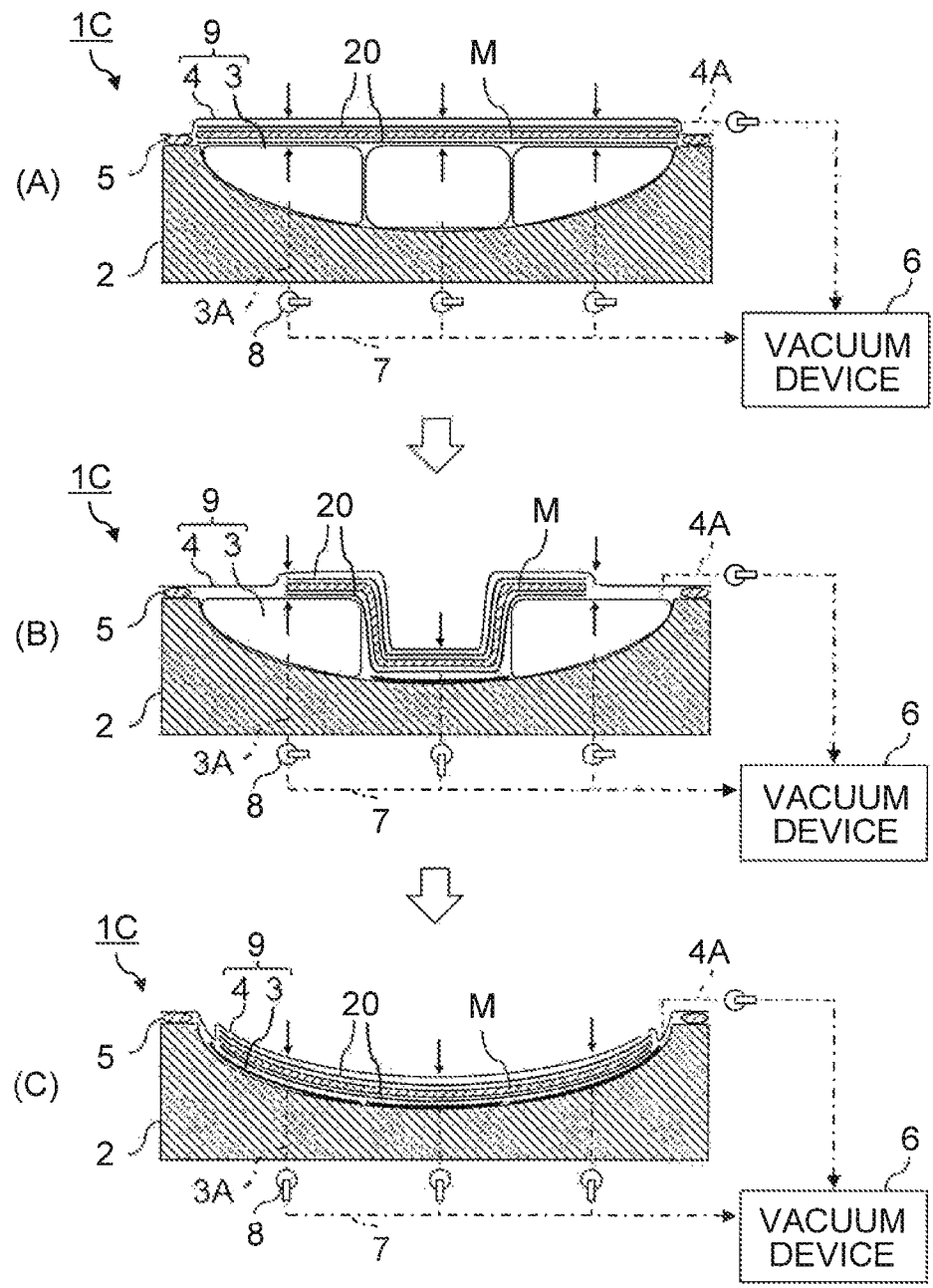
Figure 9:
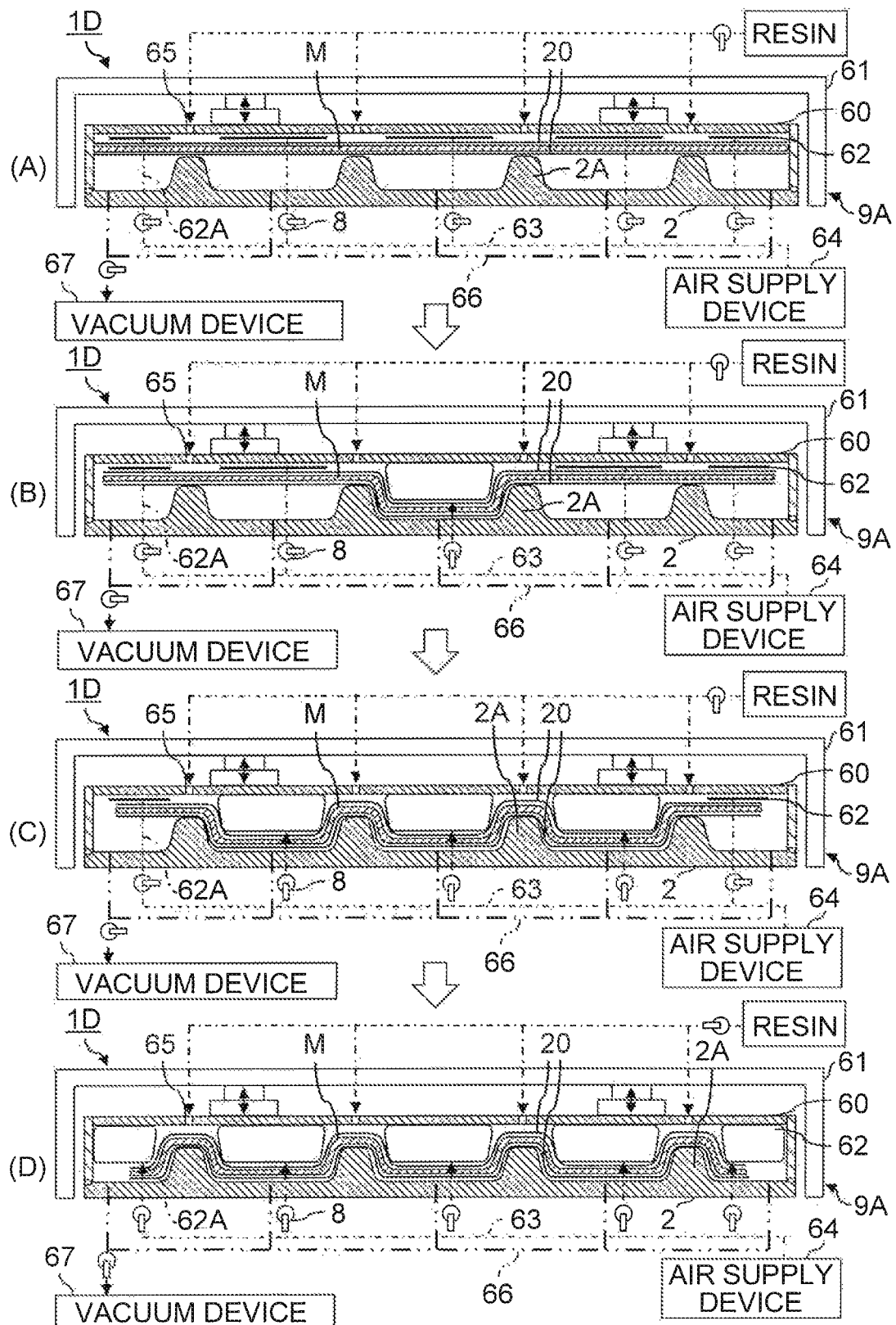
Figure 10:
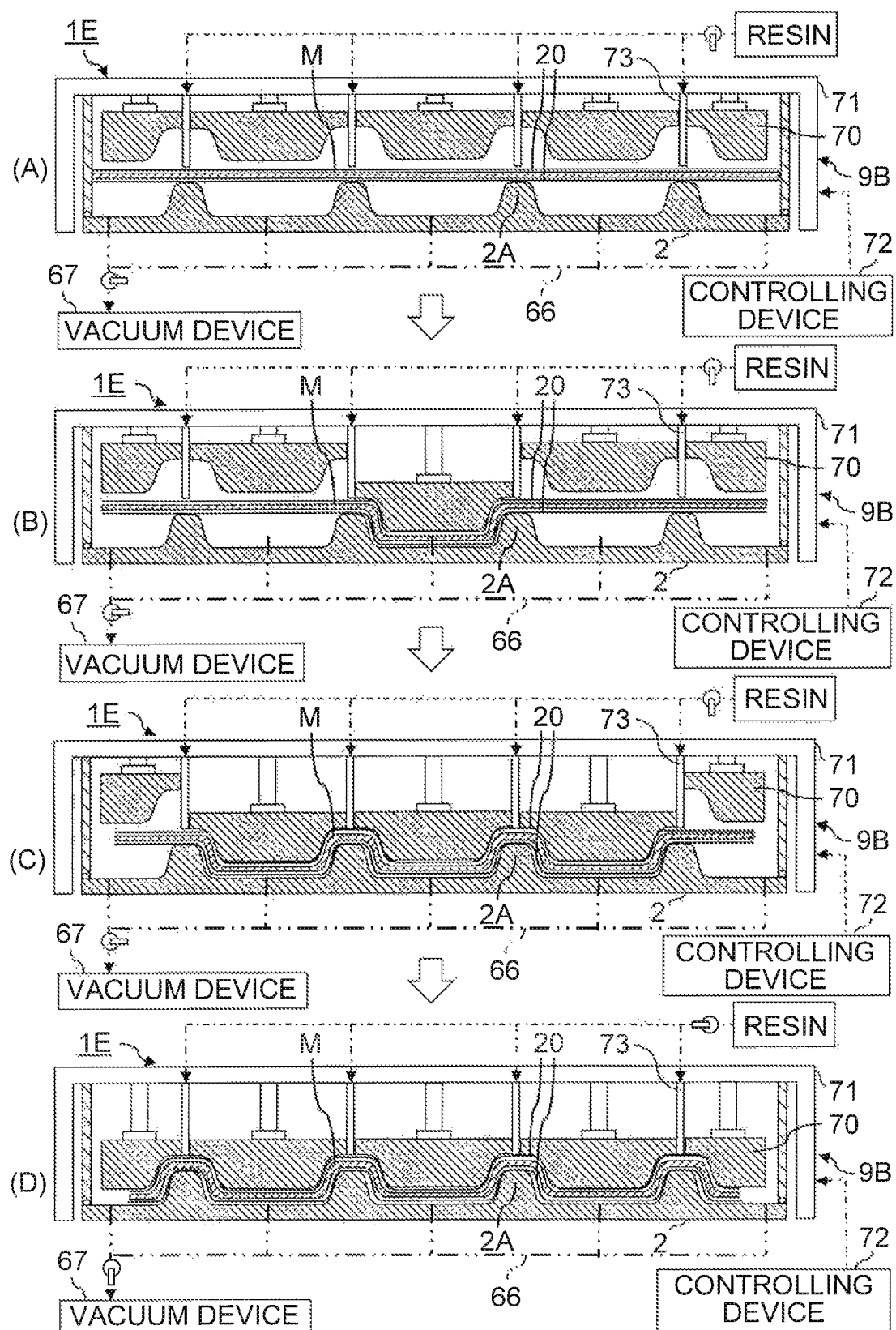

FIG, 7 is a view for explaining a preform shaping method using a preform shaping apparatus according to the third implementation of the present invention;

FIG. 8 is a view for explaining a preform shaping method using a preform shaping apparatus according to the fourth implementation of the present invention;

FIG. 9 is a view for explaining a preform shaping method using a preform shaping apparatus according to the fifth implementation of the present invention; and FIG. 10 is a view for explaining a preform shaping method using a preform shaping apparatus according to the sixth implementation of the present invention.

DETAILED DESCRIPTION

A preform shaping apparatus, a method of shaping a preform and a method of producing a composite material structure according to implementations of the present invention will be described with reference to the accompanying drawings.

First Implementation

A Preform Shaping Apparatus and a Method of Shaping a Preform

Figure 1:
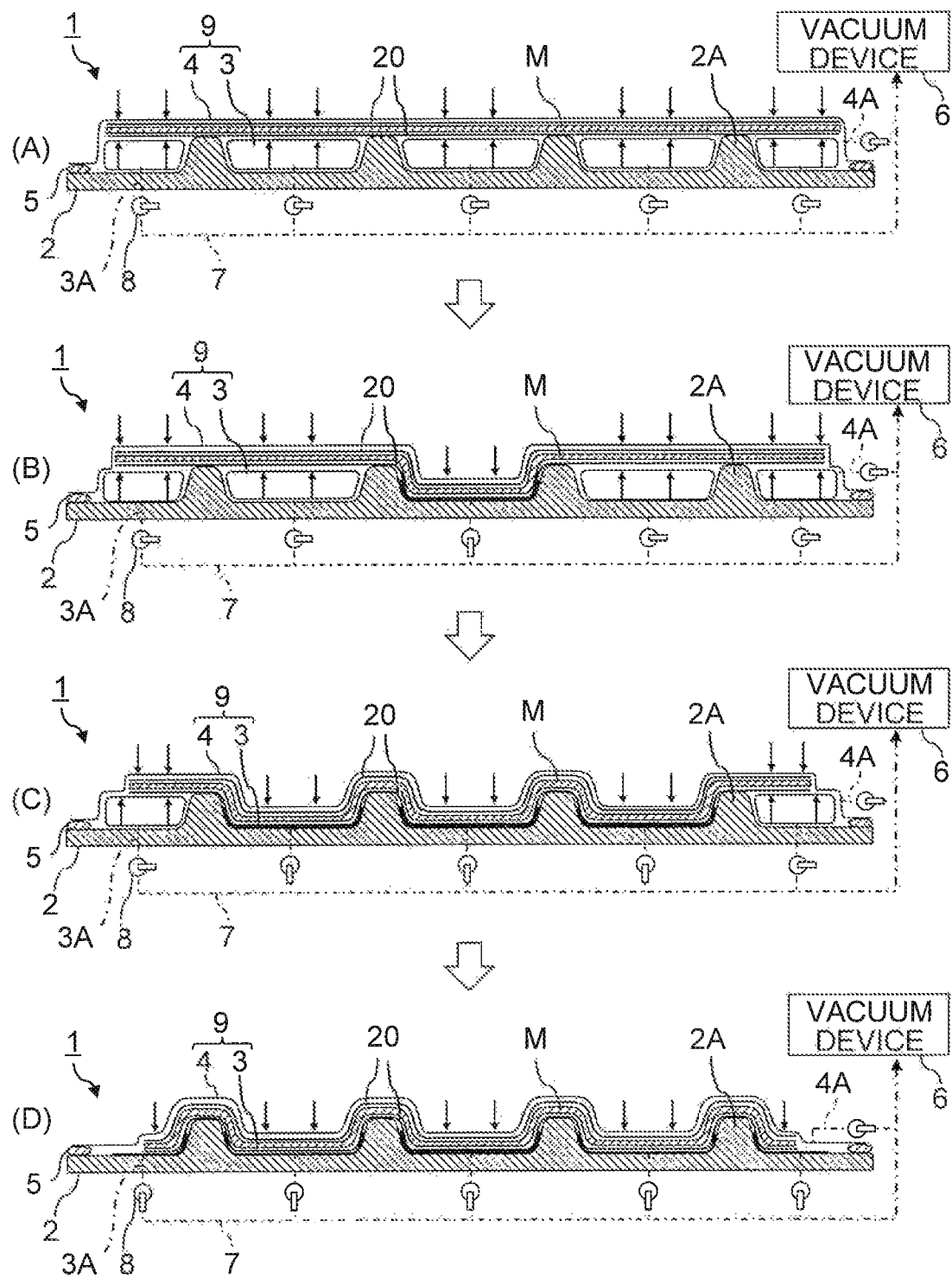
FIG. 1 is a view for explaining a preform shaping method using a preform shaping apparatus according to the first implementation of the present invention.
Figure 2:
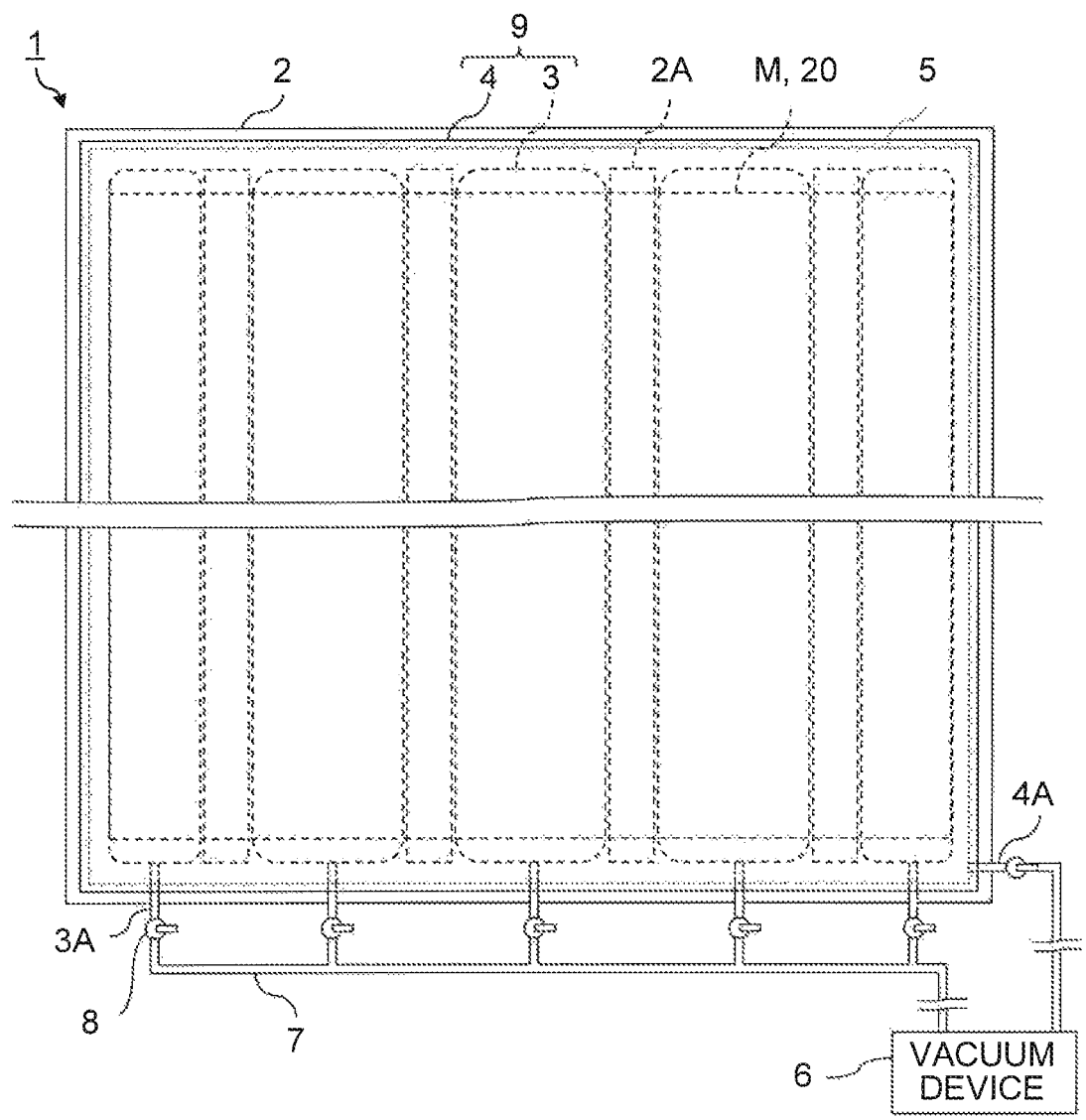
FIG. 2 is a top view of the preform shaping apparatus shown by (A) in FIG. 1.

FIG. 1 is a view for explaining a preform shaping method using a preform shaping apparatus according to the first implementation of the present invention, and FIG. 2 is a top view of the preform shaping apparatus shown by (A) in FIG. 1.

A preform shaping apparatus 1 produces a preform, having an intended shape, by shaping a material M. A preform to be produced may be a dry preform, consisting of fiber sheets which have not been impregnated with uncured thermosetting resin, or a thermally uncured composite material, consisting of fiber sheets which have been impregnated with uncured thermosetting resin.

When a dry preform is to be shaped, the material M is a laminated body of sheet-like fibers. A shaped dry preform is used as a material for molding a composite material under an RTM method. Specifically, a composite material is molded by impregnating a dry preform with uncured thermosetting resin and thermally curing the thermosetting resin with an autoclave apparatus or an oven. Therefore, a dry preform shaped with the preform shaping apparatus 1 may be continuously impregnated with resin and thermally cured. In other words, the preform shaping apparatus 1 may also be used as a molding apparatus of a composite material.

Meanwhile, when a preform made of fibers impregnated with resin is to be shaped by the preform shaping apparatus 1, the preform can be produced by either impregnating a shaped dry preform with resin, or shaping a laminated body of prepregs. Therefore, when a preform in a state that fibers have been impregnated with resin is to be shaped by the preform shaping apparatus 1, the material M is a laminated body of sheet-like fibers or a laminated body of sheet-like prepregs.

FIG. 1 shows an example of a case of producing a dry preform having a corrugated cross section by shaping fibers which have been laminated in a sheet shape. Accordingly, a case where a corrugated dry preform is shaped by the preform shaping apparatus 1 will be explained as an example with reference to FIG. 1 hereinafter.

A corrugated dry preform is used as a material of a corrugated reinforcing member, such as a corrugated stringer, a corrugated rib or a corrugated spar, made of a composite material. A corrugated reinforcing member is used as a part of a wing structure of an aircraft. Specifically, a corrugated reinforcing member is mainly attached to an upper panel or a lower panel as a member for reinforcing the panel.

The preform shaping apparatus 1 can be composed of a lower mold 2, inner vacuum bags 3 and an outer vacuum bag 4 as shown by (A) of FIG. 1. The inner vacuum bags 3 are disposed at concave portions of the lower mold 2 respectively, and the unshaped material M is placed on the lower mold 2 and the inner vacuum bags 3. Then, the material M is covered with the outer vacuum bag 4.

The lower mold 2 is a rigid mold which has a shape corresponding to a shaped preform. Therefore, when a corrugated dry preform is shaped, the lower mold 2 has corrugated concavity and convexity on the surface as shown in FIG. 1. Specifically, in order to shape projecting portions of a corrugated dry preform, convex portions 2A, each having an elongated structure, are formed on the surface of the lower mold 2. The length of each convex portion 2A formed on the surface of the lower mold 2 may be adjusted with the width of a dry preform, or may be made longer than the width of a dry preform.

Each inner vacuum bag 3 has flexibility and a closed bag structure, and is disposed between the lower mold 2 and the material M. Specifically, the inner vacuum bags 3 each having a closed structure are respectively placed between the convex portions 2A of the lower mold 2 for shaping projecting portions of a corrugated dry preform. Therefore, each inner vacuum bag 3 has a hollow tubular structure of which both ends have been closed. The material M consisting of an unshaped flat sheet-like fiber bundles can be placed on the lower mold 2 where the inflated inner vacuum bags 3 have been placed at corresponding concave portions respectively.

A tube 3A for vacuuming is coupled to at least one end part of each inner vacuum bag 3. Alternatively, a hole for vacuuming may be formed on each concave portion formed between the two adjacent convex portions 2A of the lower mold 2 while a suction port is formed on each inner vacuum bag 3 so that the suction ports formed on the inner vacuum bags 3 may be coupled to the holes for vacuuming formed on the lower mold 2 respectively.

The outer vacuum bag 4 is a bagging film for sealing at least the atmosphere side of the material M in order to bag the material M. Therefore, a tube 4A for vacuuming is also coupled to the outer vacuum bag 4. The material M is sealed by the outer vacuum bag 4 from outside in a state where the inner vacuum bags 3 have been disposed on the lower mold 2. In other words, the material M is disposed between the outer vacuum bag 4 and a set of the inner vacuum bags 3 and the convex portions 2A of the lower mold 2.

As a concrete example, the whole lower mold 2 on which the inner vacuum bags 3 and the material M have been placed can be covered by the outer vacuum bag 4, and the edge of the outer vacuum bag 4 can be stuck on the flat portion of the lower mold 2 by a sealant 5, as shown in FIG. 2. Alternatively, when the length of each convex portion 2A formed on the surface of the lower mold 2 is longer than the width of a dry preform, the end parts of each convex portion 2A may be exposed outside the outer vacuum bag 4. In that case, the edge of the outer vacuum bag 4 is stuck on the convex portions 2A of the lower mold 2 by the sealant 5.

The end part of the tube 3A attached to each inner vacuum bag 3 is led to the outside of the outer vacuum bag 4 in order to be coupled to the vacuum device 6. Therefore, it is suitable to stick a clearance gap between each tube 3A and the lower mold 2 as well as a clearance gap between each tube 3A and the outer vacuum bag 4 by the sealant 5 from a viewpoint of keeping satisfactory airtightness in an area covered by the outer vacuum bag 4.

Note that, the tube 4A for evacuating air from a space inside the outer vacuum bag 4 may be formed on the lower mold 2 instead of coupling to the outer vacuum bag 4.

Vacuuming of the area sealed by the outer vacuum bag 4 and vacuuming of the inside of each inner vacuum bag 3 are performed at different timing. Specifically, the vacuuming of the inside of each inner vacuum bag 3 is performed at an appropriate timing after the vacuuming of the area sealed by the outer vacuum bag 4.

Also in such a case, the vacuuming of the area sealed by the outer vacuum bag 4 and the vacuuming of the inside of each inner vacuum bag 3 can be performed using the common vacuum device 6 by coupling a pipe 7 as exemplified in FIG. 1 and FIG. 2. Specifically, the respective tubes 3A of the inner vacuum bags 3 and the tube 4A of the outer vacuum bag 4 can be coupled to the common pipe 7 through cocks 8 respectively. Thus, an operator can determine timing of vacuuming by opening and closing each cock 8 manually.

Alternatively, each cock 8 may be composed of an electric, hydraulic or pneumatic cock automatically opening and closing, and opening and closing of each cock 8 may be automatically controlled with a controlling device. In that case, control signals for instructing timing of vacuuming can be generated in an electric circuit, a hydraulic circuit, or a pneumatic signal circuit composing the controlling device, and the generated control signals can be output to the cocks 8 respectively. Thereby, timing of vacuuming in the inner vacuum bags 3 and the outer vacuum bag 4 to which the cocks 8 have been coupled respectively can be automatically controlled.

As a matter of course, independent vacuum devices may be coupled to the tubes 3A of the inner vacuum bags 3 and the tube 4A of the outer vacuum bag 4 respectively. In that case, an operator can determine timing for vacuuming by determining timing for switching the power supplies of the vacuum devices on respectively. Alternatively, the timing for driving each vacuum device may be automatically controlled by a controlling device which integrally controls operation of the respective vacuum devices.

The order of vacuuming in the inner vacuum bags 3 performed after vacuuming in the outer vacuum bag 4 is determined as an order by which a space is not generated between the material M and the lower mold 2 even when the material M is pressed on the lower mold 2. In a case of shaping a corrugated dry preform, portions, in which spaces are most likely to be generated, between the material M and the lower mold 2 are concave round chamfered portions at both side corners of each concave portion formed between the adjacent convex portions 2A.

Figure 3:
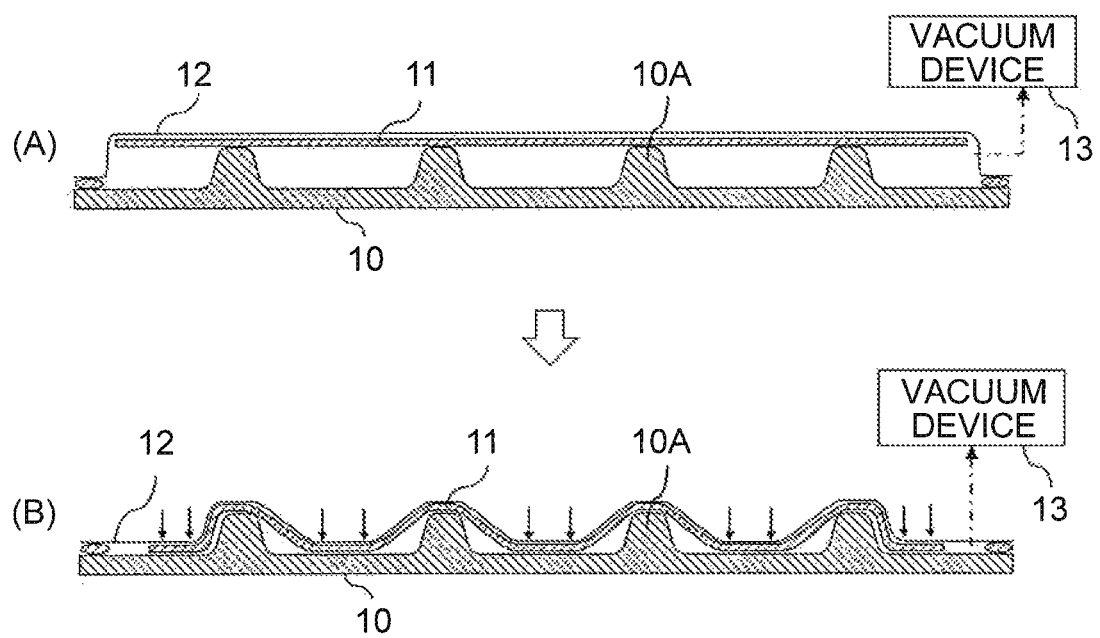
FIG. 3 is a view for explaining a problem in the conventional method of shaping a dry preform.

FIG. 3 is a view for explaining a problem in the conventional method of shaping a dry preform.

As shown by (A) of FIG. 3, unshaped fiber sheets 11 can be placed on a conventional corrugated lower mold 10 which has convex portions 10A each having an elongated structure, and then the unshaped fiber sheets 11 can be covered with a bagging film 12. When the area covered with the bagging film 12 is evacuated by the vacuum device 13, the atmospheric pressure is applied in the thickness direction of the fiber sheets 11.

As a result, as shown by (B) of FIG. 3, the fiber sheets 11 deforms and are pressed to the bottoms of concave portions of the lower mold 10, and thereby the fiber sheets 11 in contact with the convex portions 10A of the lower mold 10 are pulled toward both sides. Consequently, spaces are generated between the fiber sheets 11 and convex round chamfered portions formed at the rising portions of the convex portions 10A.

Accordingly, the preform shaping apparatus 1 evacuates the insides of the inner vacuum bags 3 in an appropriate order so that spaces may not be generated between the material M and the concave round chamfered portions of the lower mold 2. What is necessary in order to prevent spaces from being generated between the material M and the concave round chamfered portions of the lower mold 2 is to determine such an order of evacuating the insides of the inner vacuum bags 3 that the material M may be firstly pressed only to a desired concave portion selected out of the concave portions of the lower bold 10, and subsequently the material M may be pressed to adjacent one or two concave portions after the material M has contacted to the selected concave portion.

As a concrete example, as shown by (B) of FIG. 1, only the central concave portion of the lower mold 2 can be firstly selected as a target to which the material M is brought into contact. For that purpose, only the inner vacuum bag 3 placed in the central concave portion of the lower mold 2 can be evacuated. Meanwhile, each pressure inside the other inner vacuum bags 3 can be made an approximate atmospheric pressure by opening the other inner vacuum bags 3 to the atmospheric air beforehand.

As a result, only the inner vacuum bag 3 placed in the central concave portion of the lower mold 2 deflates, and thereby the material M deforms toward the surface of the central concave portion. After that, the material M fits to the selected concave portion while sliding relative to the outer vacuum bag 4 and the two adjacent convex portions 2A which form the central concave portion.

Next, as shown by (C) of FIG. 1, two concave portions in both sides adjacent to the central concave portion of the lower mold 2 can be selected as targets to which the material M are brought into contact. For that purpose, only the two inner vacuum bags 3 placed in the two concave portions in both sides adjacent to the central concave portion of the lower mold 2 can be evacuated. Thereby, the material M can be slid and fitted to the two concave portions in both sides adjacent to the central concave portion of the lower mold 2.

After that, as shown by (D) of FIG. 1, the two concave portions adjacent in the further outsides can be selected as targets to which the material M are brought into contact. Then, the material M can be fitted to the two selected concave portions by evacuating only the two corresponding inner vacuum bags 3.

Note that, although FIG. 1 shows an example where the material M is sequentially fit to the concave portions of the lower mold 2 from the central concave portion toward outside concave portions, fitting of the material M may be started from another concave portion. For example, the material M may be sequentially fitted to the concave portions from the concave portion in one end side toward the concave portion in the other end side. Regardless of any case, it may be omitted to place the inner vacuum bag 3 in the concave portion to which the material M should be firstly fit. In that case, the material M can be fitted to the first concave portion by evacuating the inside of the outer vacuum bag 4.

When the material M is sequentially fitted to the concave portions of the lower mold 2 from the center toward the outsides, the material M can be simultaneously pressed to two concave portions after pressing the material M to the central concave portion. Therefore, time required for shaping a preform can be shortened.

Meanwhile, when the material M is sequentially fitted to the concave portions of the lower mold 2 from one end side toward the other end side, a direction of sliding the material M can be made one direction after pressing the material M to the first concave portion in one end side. Therefore, such a trouble that the end part of the material M lacks the length of a preform, or conversely that an excess surplus remains can be avoided. As a concrete example, when a corrugated dry preform of which both end parts are concave is shaped as exemplified in FIG. 1, the material M can be shaped so that one edge of the material M may be coincided with one edge of a dry preform, and subsequently the material M can be slid in one direction and sequentially fitted to the other concave portions.

Thus, when the inner vacuum bags 3 each substantially opened to the atmospheric air are placed in the area sealed by the outer vacuum bag 4, a shape deformation of the material M can be temporarily stopped while shaping of the fiber sheets 11 is started in the conventional shaping method as shown in FIG. 3 once the inside of the bagging film 12 is made a vacuum state. Therefore, a part of the material M can be shaped by selecting and evacuating a desired inner vacuum bag 3. As a result, the material M can be certainly brought into contact to each concave corner portion of the lower mold 2, and thereby a preform which has a target shape can be produced.

Note that, the tubes 3A attached to the inner vacuum bags 3 are desirable to be flatly crushed by evacuating the insides of the inner vacuum bags 3 respectively in the area sealed by the outer vacuum bag 4. Therefore, it is appropriate to make each of the tubes 3A attached to the inner vacuum bags 3 of a material having flexibility as well as the inner vacuum bags 3.

Moreover, the length of each inner vacuum bag 3 may be made different from the length of a concave portion of the lower mold 2 without coinciding with the length of the concave portion of the lower mold 2, as exemplified in FIG. 2. When the length of each inner vacuum bag 3 is made long so that the inner vacuum bag 3 protrudes to the outside of the area sealed by the outer vacuum bag 4, air inflow into the outer vacuum bag 4 after evacuation can be prevented by sealing a clearance gap between the outer vacuum bag 4 and each inner vacuum bag 3, and a clearance gap between each inner vacuum bag 3 and the lower mold 2.

On the contrary, the length of each inner vacuum bag 3 may be made shorter than the length of the convex portion 2A of the lower mold 2. In that case, the edge portion of the material M is stretched between the adjacent convex portions 2A immediately after evacuating the insides of the outer vacuum bags 4, and thereby spaces may be generated between the material M and the lower mold 2. Nevertheless, when the insides of the inner vacuum bags 3 are evacuated respectively, the edge portion of the material M deforms following deformations of the central portions of the material M. Therefore, not only the central portions of the material M but the edge portion can be brought into contact to the concave portions of the lower mold 2.

The material M is pressed on the rigid lower mold 2, which has a form corresponding to a form of a shaped preform, at different timing and positions utilizing the atmospheric pressure. Therefore, it can be said that a pressurizing jig 9, which presses the material M before shaping a preform at different positions and timing, is formed by the inner vacuum bags 3 and the outer vacuum bag 4.

The outer vacuum bag 4 composing the pressurizing jig 9 undertakes a role of applying a differential pressure between a pressure in the area sealed by the outer vacuum bag 4 and the atmospheric pressure, on the material M at different positions. Meanwhile, the inner vacuum bags 3 composing the pressurizing jig 9 are placed between the lower mold 2 and the material M, and undertake a role of pressing the material M on the lower mold 2 at different positions and timing by changing the timing of vacuuming. For that purpose, the inner vacuum bags 3 are placed at positions corresponding to the different positions for pressing the material M, i.e., the back side of the positions where the sheet like material M is pressed using the atmospheric pressure.

Thus, a shaped preform can be produced by pressing the material M at different positions and timing using the pressurizing jig 9 composed of the inner vacuum bags 3 and the outer vacuum bag 4.

As mentioned above, a preform to be produced may be not only a dry preform but also a preform consisting of fibers which have been impregnated with resin. For example, a preform consisting of fibers which have been impregnated with resin can be produced by injecting uncured resin into the outer vacuum bag 4 with maintenance of vacuuming of the insides of the outer vacuum bag 4 and the inner vacuum bags 3 after shaping a dry preform. In that case, an injection port for injecting resin is formed in the outer vacuum bag 4 or the lower mold 2.

Alternatively, a preform consisting of fibers which have been impregnated with resin can be produced by shaping the material M consisting of a laminated body of prepreg sheets instead of fiber sheets. That is, a corrugated laminated body of prepregs can be shaped as a preform.

Moreover, a shape of a preform may be not only a corrugated shape but also a shape having a plurality of concave portions. Specifically, so long as the lower mold 2 has at least two concave portions in which the inner vacuum bags 3 can be placed, an effect of preventing spaces between the material M and the lower mold 2 due to stretching the material M from being generated can be achieved by changing timing for evacuating the insides of the inner vacuum bags 3. Therefore, a dry preform or a laminated body of prepregs having concave portions can be shaped with the preform shaping apparatus 1.

When the material M is shaped by the preform shaping apparatus 1 composed of the lower mold 2, the inner vacuum bags 3 and the outer vacuum bag 4, it is necessary to slide the material M between the outer vacuum bag 4, and the convex portions 2A of the lower mold 2 and the inner vacuum bags 3. Accordingly, a sheet 20 for sliding the material M to the convex portions 2A of the lower mold 2 and the inner vacuum bags 3 may be placed at least between the material M, and the lower mold 2 and the inner vacuum bags 3.

In addition, when a dry preform is shaped, it is also important to prevent fray from being generated in fiber sheets. Therefore, it is desirable to shield both sides of sheet like fibers by the sheets 20 as illustrated, from a viewpoint of smoothly sliding the fibers relative to the lower mold 2, the inner vacuum bags 3 and the outer vacuum bag 4 so as to prevent the generation of fray.

Meanwhile, also in a case that the material M is a laminated body of prepregs, it is required to smoothly slide the laminated body of prepregs relative to the convex portions 2A of the lower mold 2, the inner vacuum bags 3 and the outer vacuum bag 4 without the adhesion. Accordingly, also when the material M is a laminated body of prepregs, it is desirable to shield both sides of the material M by the sheets 20 as illustrated.

The material of the sheet 20 for smoothly sliding the material M may be polytetrafluoroethylene (PTFE), paper, polyethylene or the like.

Moreover, when a dry preform is shaped, it is desirable to place binder between layers of a laminated body of fiber sheets, which is used as the material M of the dry preform, from a viewpoint of keeping a form of the shaped dry preform more certainly. For example, a veil-shaped thermoplastic binder made of polyolefin, polyester, polyethylene, polypropylene, polyethylene terephthalate, polyamide, copolyester, or mixture thereof can be inserted among fiber sheets. Alternatively, powdered thermoplastic binder may be dredged among fibers. Moreover, rubber or epoxy binder may be used.

When thermoplastic binder is placed among fiber layers, a dry preform is shaped by heating the binder with an oven or the like so that the binder may be melted. That is, a laminated body of fiber sheets including thermoplastic binder is shaped in high temperature environment in an oven. Then, when the laminated body of fiber sheets is cooled down to a normal temperature, the melted thermoplastic binder is cured again inside the shaped laminated body of fiber sheets, and thereby a shape of the dry preform can be kept.

Moreover, fiber sheets including Z-threads for bearing strength in a thickness direction of a dry preform may also be used as the material M of the dry preform. Z-threads are fibers which bear strength in a thickness direction of fiber sheets, and fibers including Z-threads can be produced by weaving fibers spatially. A fabric of which fibers have been woven spatially is also called a three dimensional fabric. Practical examples include a three dimensional fabric where some fibers are disposed in a corrugated shape whose amplitude direction is a thickness direction of the fiber sheets.

When a three dimensional fabric including Z threads is the material M of a dry preform, the dry preform can be shaped without using and heating thermoplastic binder. This is because a three dimensional fabric including Z threads has a function to keep a deformed shape.

A Method of Producing a Composite Material Structure

Figure 4:
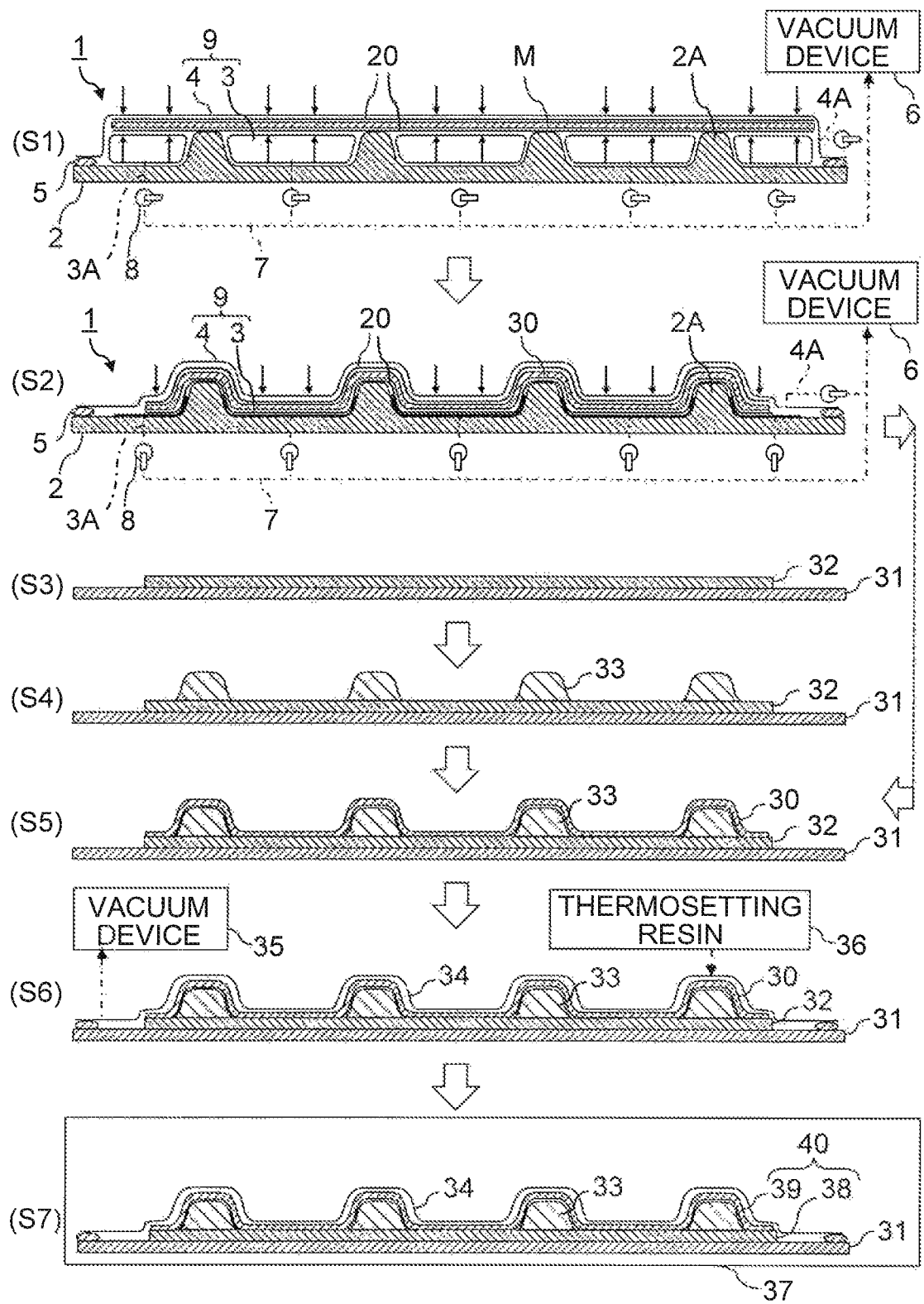
FIG. 4 is a view for explaining a method of integrally molding a composite material structure composed of a panel and a corrugated reinforcing member attached to the panel, using a dry preform produced with the preform shaping apparatus shown in FIG. 1.

Next, a method of producing a composite material structure using the preform shaping apparatus 1 will be described:

FIG. 4 is a view for explaining a method of integrally molding a composite material structure composed of a panel and a corrugated reinforcing member attached to the panel, using a dry preform produced with the preform shaping apparatus 1 shown in FIG. 1.

Firstly, a corrugated dry preform is produced using the preform shaping apparatus 1. For that purpose, in step S1, the inflated inner vacuum bags 3 are placed between the convex portions 2A of the lower mold 2 respectively.

Then, a laminated body of fiber sheets of which both sides are desirably shielded by the sheets 20, such as PTFE, is placed, as the material M, on the inner vacuum bags 3 and the convex portions 2A of the lower mold 2. In other words, the inner vacuum bags 3 are disposed between the lower mold 2 and the material M, at the opposite side of positions where the material M is pressed to the concave portions of the lower mold 2 using the atmospheric pressure respectively.

The laminated body of the fiber sheets used as the material M can be produced by laminating the fiber sheets on the convex portions 2A of the lower mold 2 and the inner vacuum bags 3 with an automatic laminating device or manually by an operator, for example. Alternatively, the laminated body of the fiber sheets may be produced by laminating the fiber sheets on another rigid jig of which surface is flat. Moreover, a commercially available laminated body of fiber sheets may be placed on the convex portions 2A of the lower mold 2 and the inner vacuum bags 3.

It is desirable to set powdered or veil-shaped thermoplastic binder between plies of the fiber sheets. Alternatively, a laminated body of fibers including Z-threads may also be used as the material M. When a laminated body of fibers including Z-threads is used as the material M, the use of the binder can be omitted.

Then, the material M is sealed by the outer vacuum bag 4 from the outside in a state where the inner vacuum bags 3 have been placed. Specifically, the outer vacuum bag 4 is stuck on the lower mold 2 by the sealant 5. Then, the tube 4A of the outer vacuum bag 4 is coupled to the pipe 7 for vacuuming. Meanwhile, the power supply of the vacuum device 6 is turned on, and thereby the vacuum device 6 drives.

Next, the cock 8 attached to the tube 4A of the outer vacuum bag 4 is opened. At this time, the respective tubes 3A of the inner vacuum bags 3 are not coupled to the pipe 7, and the respective inner vacuum bags 3 are opened to the atmospheric air. Therefore, air is discharged only from a space among the respective inner vacuum bags 3 and the outer vacuum bag 4. As a result, the closed area sealed by the outer vacuum bag 4 becomes a vacuum state. Therefore, the respective inner vacuum bags 3 remains the inflated state, and the material M is supported on the inflated inner vacuum bags 3 and the convex portions 2A of the lower mold 2, in an approximately flat state, as shown by (A) of FIG. 1.

Next, in step S2, the tubes 3A of the inner vacuum bags 3 are coupled to the pipe 7 for vacuuming, and the atmospheric temperature is increased with a heating device.

Then, the cocks 8 attached to the tubes 3A of the inner vacuum bags 3 are sequentially opened at different timing. As a result, air is sequentially discharged from the insides of the inner vacuum bags 3, and the insides of the inner vacuum bags 3 become a vacuum state at the different timing. As a concrete example, the vacuuming is sequentially performed from the central inner vacuum bag 3 toward the inner vacuum bags 3 in both end sides as shown by (B), (C) and (D) of FIG. 1.

Thereby, the inner vacuum bags 3 sequentially deflate, and the material M is pushed against the lower mold 2 at the different positions and timing using the atmospheric pressure. At this time, the material M slides and moves between the outer vacuum bag 4, and the convex portions 2A of the lower mold 2 and the inner vacuum bags 3 before vacuuming. The material M can be smoothly slid by shielding both sides of the material M by the sheets 20 made of PTFE or the like.

When the insides of all the inner vacuum bags 3 have become a vacuum state and all the inner vacuum bags 3 have deflated, the material M contacts to the corrugated lower mold 2 without clearances as shown by (D) of FIG. 1. When the material M is fibers including Z-threads and inserting thermoplastic binder is omitted, shaping of a dry preform 30 is completed by pressing the material M to the lower mold 2 using the atmospheric pressure. That is, the dry preform 30 which has been shaped into a corrugated shape can be obtained.

Meanwhile, when thermoplastic binder is included in the material M, the material M is made to contact to the corrugated lower mold 2 under a heating environment with an oven or the like. As a result, the thermoplastic binder melts inside the material M which has deformed into the corrugated shape. After that, when the temperature of the material M is returned to the normal temperature by air cooling or the like, the thermoplastic binder is cured again inside the material M which has deformed into the corrugated shape. Thereby, shaping of the dry preform 30 is completed. That is, the dry preform 30 which has been shaped into the corrugated shape can be obtained.

Meanwhile, in step S3, prepregs 32 for an upper panel or a lower panel are laminated on a rigid lower mold 31 for molding a composite material. Thereby, a laminated body of the prepregs 32 for the panel is produced.

Next, in step S4, core jigs 33 formed according to the shape of the corrugated dry preform 30 are placed on the laminated body of the prepregs 32 for the panel, which has been laminated on the lower mold 31. As necessary, jigs for positioning the core jigs 33 are used for placing the core jigs 33.

Next, in step S5, the corrugated dry preform 30 produced by the preform shaping apparatus 1 is set on the laminated body of the prepregs 32 for the panel and the core jigs 33. For that purpose, the corrugated dry preform 30 is previously removed from the preform shaping apparatus 1.

Next, in step S6, the dry preform 30 which has been set on the laminated body of the prepregs 32 for the panel and the core jigs 33 is bagged with a vacuum bag 34. That is, the area sealed by the vacuum bag 34 is evacuated by a vacuum device 35. Then, uncured thermosetting resin 36 is injected into the area sealed by the vacuum bag 34. The thermosetting resin 36 can be injected from a resin injection port formed in the vacuum bag 34 or the lower mold 31. Alternatively, the vacuum bag 34 may be sealed with the core jigs 33 and the lower mold 31 so that end portions of the core jigs 33 protrude outside the vacuum bag 34, and the thermosetting resin 36 may be injected from a resin injection port, formed in at least one of the core jigs 33, to the area sealed by the vacuum bag 34. Thereby, the corrugated dry preform 30 is impregnated with the uncured thermosetting resin 36.

Next, in step S7, the thermosetting resin 36 with which the laminated body of the prepregs 32 for the panel and the corrugated laminated body of fibers have been impregnated is thermally cured by a heating device 37, such as an oven or an autoclave apparatus. Thereby, a composite material structure 40 having a panel 38 and a corrugated reinforcing member 39 attached to the panel 38 can be produced. The composite material structure 40 having the panel 38 and the corrugated reinforcing member 39 attached to the panel 38 can be used as a part of a fuselage or a wing structure composing a main wing, a horizontal tail, a vertical tail or a center wing.

Although FIG. 4 shows a method for integrally molding the composite material structure 40, having a structure in which the corrugated reinforcing member 39 has been attached to the panel 38, by a hybrid method by which the corrugated reinforcing member 39 is produced by a VaRTM method while the panel 38 is produced by laminating and thermally curing prepregs, the composite material structure 40 having the panel 38 and the corrugated reinforcing member 39 attached to the panel 38 may also be produced by another molding method with the preform shaping apparatus 1.

Figure 5:
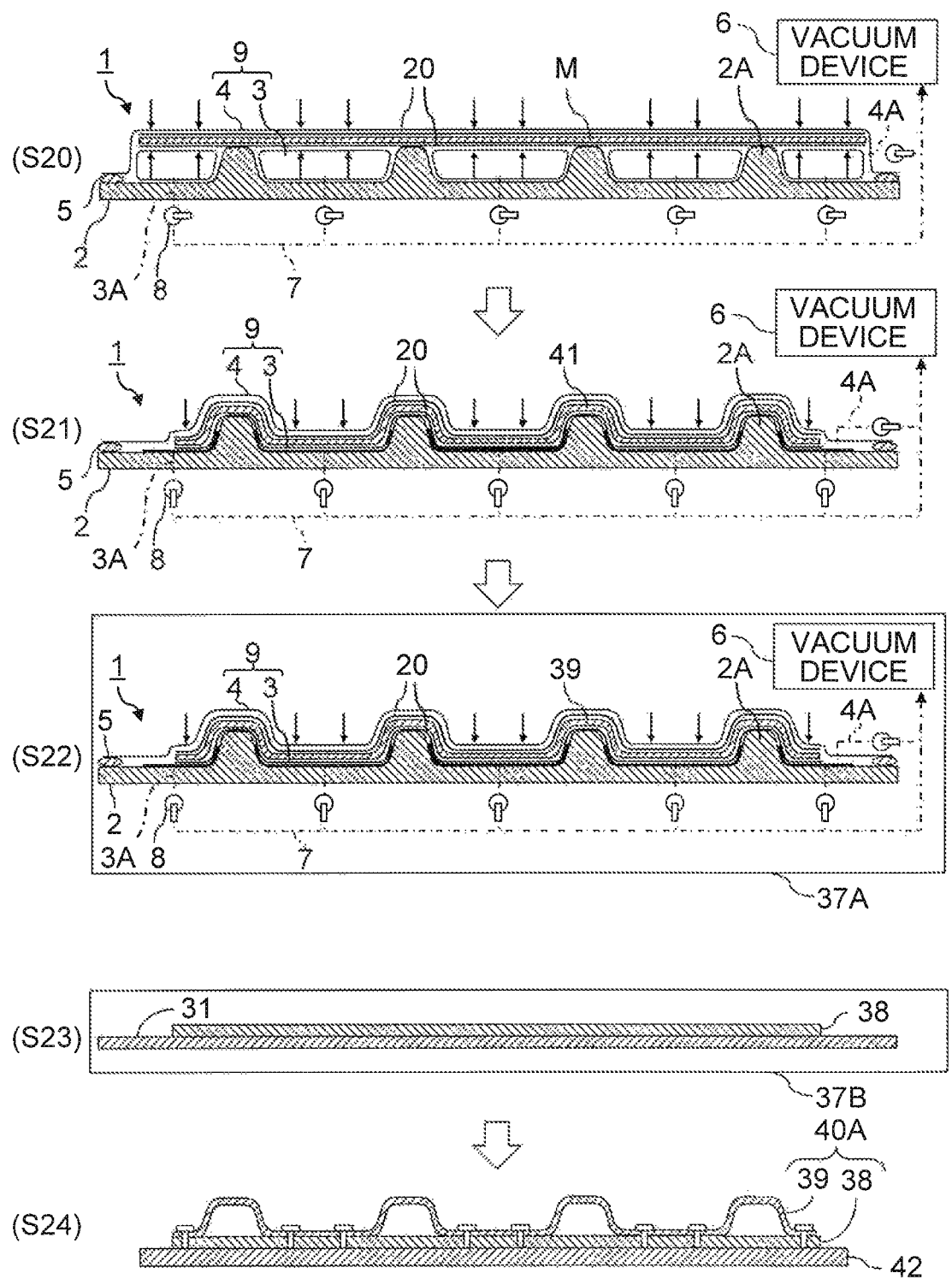
FIG. 5 is a view for explaining a method of producing a composite material structure, composed of the panel and the corrugated reinforcing member attached to the panel, by assembling the panel produced separately from the corrugated reinforcing member produced by the preform shaping apparatus shown in FIG. 1.

FIG. 5 is a view for explaining a method of producing a composite material structure 40A, composed of the panel 38 and the corrugated reinforcing member 39 attached to the panel 38, by assembling the panel 38 produced separately from the corrugated reinforcing member 39 produced by the preform shaping apparatus 1 shown in FIG. 1.

Firstly, a corrugated laminated body of prepregs is produced using the preform shaping apparatus 1. For that purpose, in step S20, the inflated inner vacuum bags 3 are placed between the convex portions 2A of the lower mold 2 respectively.

Then, a laminated body of prepreg sheets of which both sides are desirably shielded by the sheets 20, such as PTFE, is placed, as the material M, on the inner vacuum bags 3 and the convex portions 2A of the lower mold 2. In other words, the inner vacuum bags 3 are disposed between the lower mold 2 and the material M, at the opposite side of positions where the material M is pressed to the concave portions of the lower mold 2 using the atmospheric pressure respectively.

The laminated body of the prepregs laminated approximately flatly and used as the material M can be produced by laminating the prepreg sheets on the convex portions 2A of the lower mold 2 and the inner vacuum bags 3 with an automatic laminating device or manually by an operator, for example. Alternatively, the laminated body of the prepreg may be produced by laminating the prepreg sheets on another rigid jig of which surface is flat.

Then, the material M is bagged by the outer vacuum bag 4 while the insides of the inner vacuum bags 3 are kept at an approximately atmospheric pressure, similarly to the operation in step S1 of FIG. 4. Thus, the material M is kept in an approximately flat state on the inflated inner vacuum bags 3 and the convex portions 2A of the lower mold 2 as shown by (A) of FIG. 1.

Next, in step S21, the atmospheric temperature is increased by an oven or the like, and the insides of the inner vacuum bags 3 are evacuated sequentially, similarly to the operation in step S2 of FIG. 4. Thereby, the material M consisting of the laminated body of the prepregs can be contacted to the corrugated lower mold 2 without generating clearances, as shown by (D) of FIG. 1. As a result, a laminated body 41 of the prepregs which has been shaped into a corrugated shape can be produced. That is, a corrugated preform made of the fibers impregnated with the resin can be obtained.

Next, in step S22, the laminated body 41 of the prepregs which has been shaped into the corrugated shape is thermally cured. Specifically, the laminated body 41 of the prepregs bagged by the outer vacuum bag 4 is thermally cured by a heating device 37A, such as an oven or an autoclave apparatus. Thereby, the corrugated reinforcing member 39 can be molded from the material consisting of the corrugated laminated body 41 of the prepregs.

Meanwhile, in step S23, the panel 38 made of a composite material is produced by a desired molding method. For example, the panel 38 made of the composite material can be produced by laminating prepregs for the panel on the lower mold 31 as shown in step S3 of FIG. 4, and subsequent thermal curing of the laminated prepregs with a heating device 37B, such as an oven or an autoclave apparatus.

Next, in step S24, the corrugated reinforcing member 39 is assembled with the panel 38 made of the composite material. For example, the panel 38 made of the composite material can be placed on an assembly jig 42, and the corrugated reinforcing member 39 can be attached to the panel 38 using adhesive or fasteners. Thus, the composite material structure 40A having the structure in which the corrugated reinforcing member 39 has been attached to the panel 38 can be produced.

Besides the example shown in FIG. 5, a corrugated preform consisting of fibers impregnated with resin may be produced by a VaRTM method using a laminated body of fiber sheets as the material M. In that case, the corrugated reinforcing member 39 can be molded by thermal curing of the preform, bagged with the outer vacuum bag 4, by an oven, an autoclave apparatus or the like. In other words, the corrugated dry preform 30 produced by the preform shaping apparatus 1 in the example shown in FIG. 4 may not be removed from the preform shaping apparatus 1, and continuously the corrugated reinforcing member 39 can be molded by a VaRTM method.

Thus, the preform shaping apparatus 1 can be used not only as an apparatus for shaping a preform but also as a composite material molding apparatus carried into an oven, an autoclave apparatus or the like to be used for thermal curing of a composite material.

Effects

As described above, the preform shaping apparatus 1, the method of shaping a preform and the method of producing a composite material structure can bring the material M into contact to the concave portions of the lower mold 2 certainly by bagging the inner vacuum bags 3 together with the material M with the outer vacuum bag 4, and evacuating the insides of the inner vacuum bags 3 sequentially at different timing.

Therefore, according to the preform shaping apparatus 1, the method of shaping a preform and the method of producing a composite material structure, a preform and a composite material having a complicated shape, which could not be produced with satisfactory quality by a conventional method, can be produced by a simple apparatus at low cost. That is, only the lower mold 2 can be needed as a shaping mold having concavity and convexity, by utilizing the atmospheric pressure. In other words, it is not necessary to produce an upper mold which has a complicated shape.

Moreover, laying the sheets 20 made of PTFE or the like makes it possible to smoothly slide the material M relative to the lower mold 2, the inner vacuum bags 3, and the outer vacuum bag 4 while preventing disorder of fibers.

Second Implementation

Figure 6:
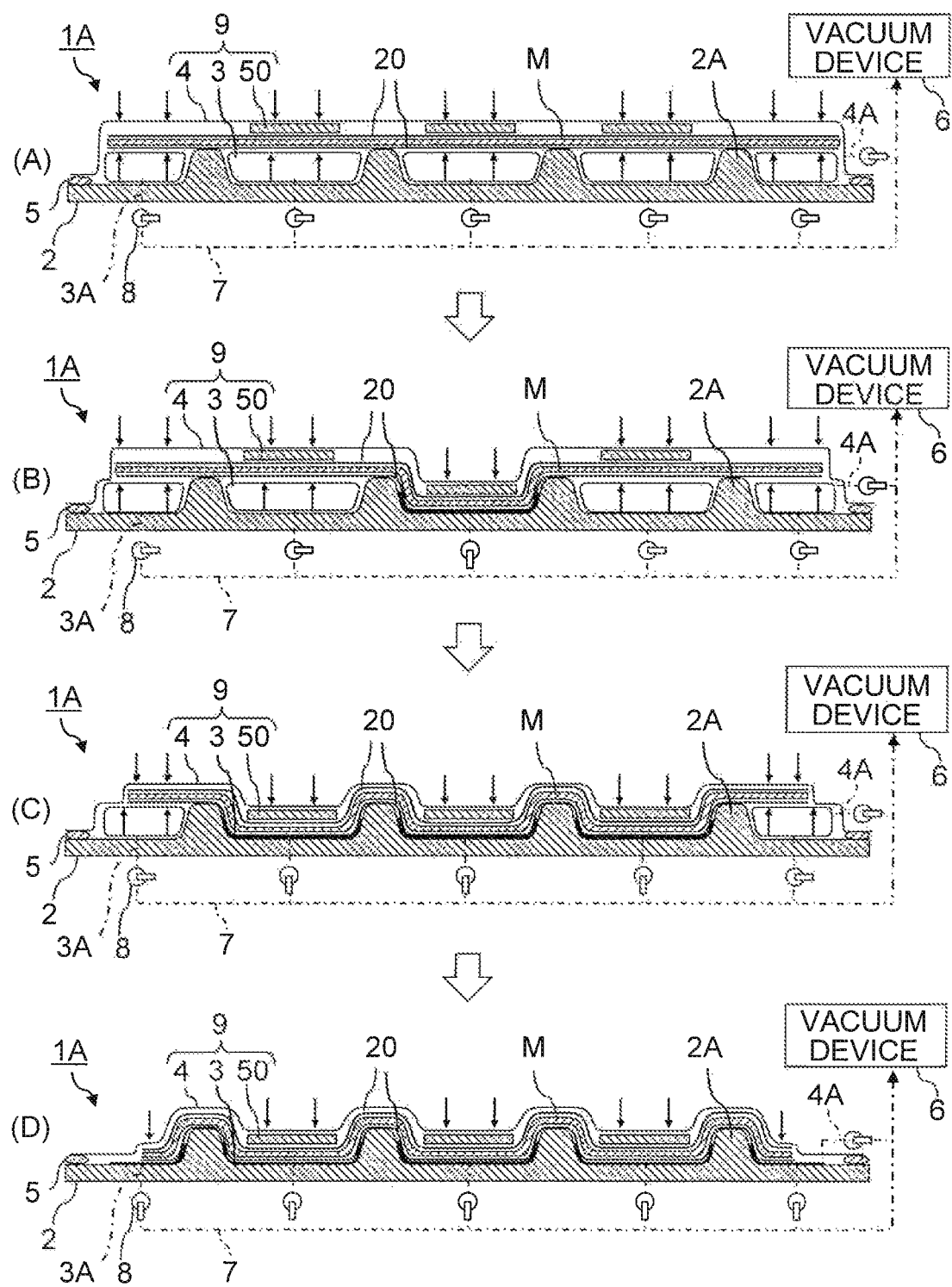
FIG. 6 is a view for explaining a preform shaping method using a preform shaping apparatus according to the second implementation of the present invention.

FIG. 6 is a view for explaining a preform shaping method using a preform shaping apparatus according to the second implementation of the present invention.

A method of shaping a preform using a preform shaping apparatus 1A in the second implementation shown in FIG. 6 is different from the method of shaping a preform using the preform shaping apparatus 1 in the first implementation in a point that rigid plates 50 having shapes corresponding to the shapes of the concave portions of the lower mold 2 respectively are placed between the outer vacuum bag 4 and the material M. Since other structures and actions in the second implementation are not substantially different from those in the first implementation, explanation for the same or corresponding elements is omitted with attaching the same signs.

As shown in FIG. 6, the rigid plates 50 which have shapes corresponding to the shapes of the concave portions of the lower mold 2 can be placed between the outer vacuum bag 4 and the material M. In this case, the material M is sandwiched between the inner vacuum bags 3 and the plates 50 as shown by (A) of FIG. 6.

Each plate 50 can be made of a metal or a composite material which has necessary strength, for example. Moreover, each plate 50 is made of a material which has the heat resistance to heating when thermoplastic binder is heated to be melted at the time of shaping a preform and when a composite material is thermally cured using the preform shaping apparatus 1A.

Each plate 50 has a shape whose width is equivalent to the distance between the adjacent convex portions 2A. The length of each plate 50 can be made equivalent to the length of the inner vacuum bag 3 or the length of the convex portion 2A, for example.

When the material M is held between the inner vacuum bags 3 and the plates 50 each having the appropriate width, as described above, the rigid plates 50 can be fitted to the concave portions respectively after the inner vacuum bags 3 have been deflated, as shown by (B), (C) and (D) of FIG. 6. As a result, the material M can be pressed to the round chamfered portions formed at the corners of the concave portions of the lower mold 2 more certainly, as shown by (D) of FIG. 6, in a case where a dry preform or a laminated body of prepregs, having a plurality of concave portions, like a corrugated dry preform or a corrugated laminated body of prepregs is shaped. That is, generation of clearances between the material M and the concave portions of the lower mold 2 can be prevented more certainly. Therefore, it becomes possible to shape a preform with more satisfactory quality.

Third Implementation

Figure 7:
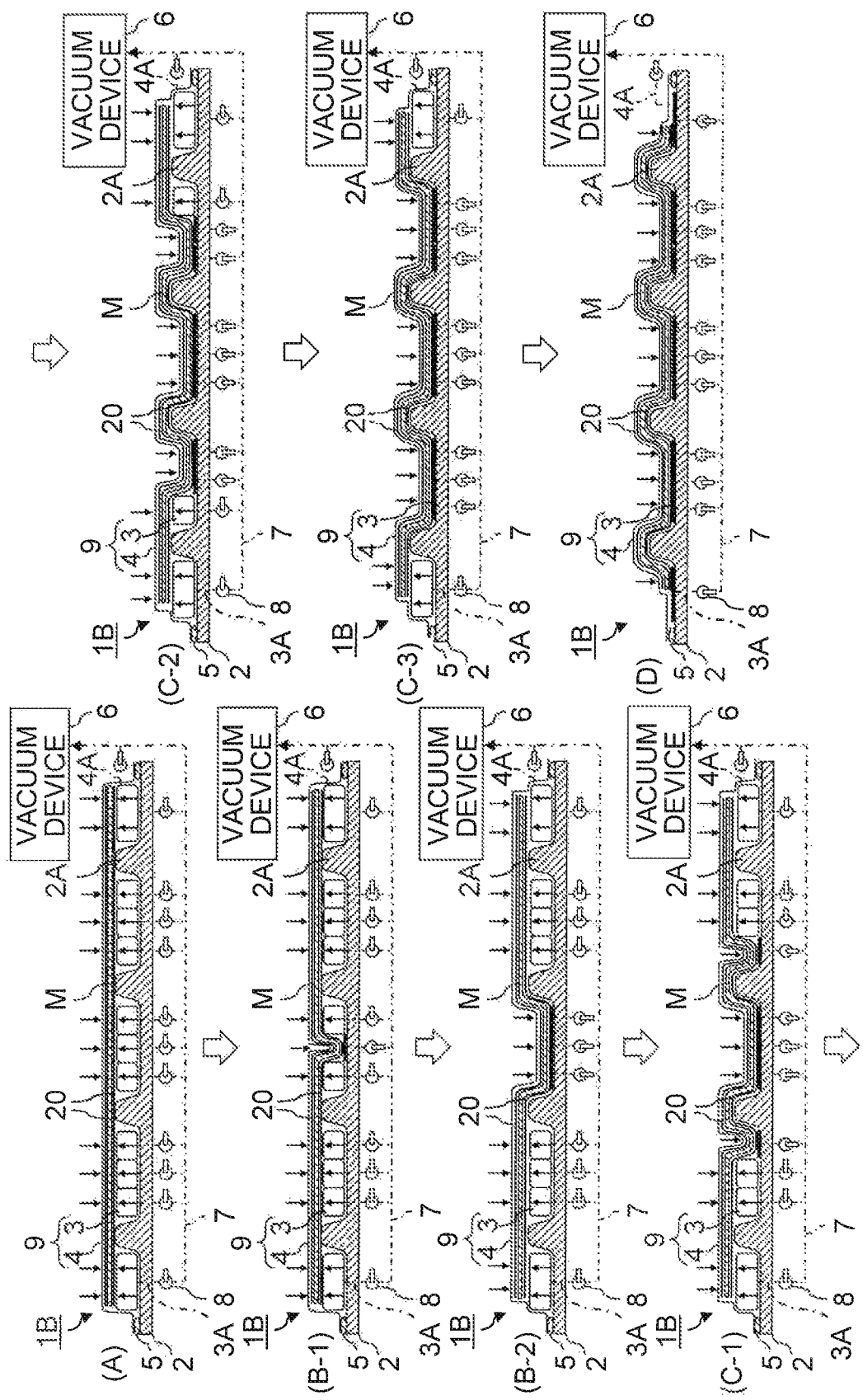

FIG. 7 is a view for explaining a preform shaping method using a preform shaping apparatus according to the third implementation of the present invention.

A method of shaping a preform using a preform shaping apparatus 1B in the third implementation shown in FIG. 7 is different from the method of shaping a preform using the preform shaping apparatus 1 in the first implementation in a point that a plurality of the inner vacuum bags 3 are placed in at least one of the concave portions of the lower mold 2. Since other structures and actions in the third implementation are not substantially different from those in the first implementation, explanation for the same or corresponding elements is omitted with attaching the same signs.

As shown by (A) of FIG. 7, two or more inner vacuum bags 3 may be placed between the adjacent two convex portions 2A of the lower mold 2. In this case, the inner vacuum bags 3 between the adjacent two convex portions 2A can be sequentially evacuated at different timing. When the three inner vacuum bags 3 are placed between each adjacent convex portions 2A as shown by (A) of FIG. 7, and the material M is pressed to the central concave portion firstly, for example, the inner vacuum bag 3 disposed at the center in the center concave portion can be evacuated and deflated as shown by (B-1) of FIG. 7, and subsequently the two inner vacuum bags 3 disposed at both sides can be evacuated and deflated as shown by (B-2) of FIG. 7, Then, as for the two concave portions adjacent to the central concave portion, the inner vacuum bags 3 can be evacuated and deflated sequentially from the inner vacuum bags 3 closest to the central concave portion as shown by (C-1), (C-2) and (C-3) of FIG. 7. Finally, the inner vacuum bags 3 disposed in the two concave portions in both end sides of the lower mold 2 where the convex portion 2A stands in only one side can be evacuated and deflated as shown by (D) of FIG. 7.

Accordingly, the material M can be gradually pressed to each concave portion formed between the adjacent convex portions 2A. Therefore, the distance by which the material M slides can be made not more than a constant distance, which can prevent disorder and wrinkle from being generated more certainly. Moreover, it is possible to prevent the material M from being pulled and stretched toward both sides between the adjacent convex portions 2A, and thereby the material M can be pressed to the round chamfered portions formed at the corners of the concave portions of the lower mold 2 more certainly.

Fourth Implementation

FIG. 8 is a view for explaining a preform shaping method using a preform shaping apparatus according to the fourth implementation of the present invention.

A method of shaping a preform using a preform shaping apparatus 1C in the fourth implementation shown in FIG. 8 is different from the method of shaping a preform using the preform shaping apparatus 1 in the first implementation in a point that a curved panel-shaped preform is shaped. Since other structures and actions in the fourth implementation are not substantially different from those in the first implementation, explanation for the same or corresponding elements is omitted with attaching the same signs.

As shown in FIG. 8, a convexly or concavely curved panel-shaped preform can be also shaped by the lower mold 2 and the pressurizing jig 9 composed of the inner vacuum bags 3 and the outer vacuum bag 4. That is, a dry preform or a laminated body of prepregs which has a curved structure can be shaped.

When a curved panel-shaped preform is shaped, a surface of the lower mold 2 which is a rigid mold having a shape corresponding to that of a shaped preform has a curved shape without any local concavities and convexities. In an example shown in FIG. 8, a concavely curved face has been formed on the surface of the lower mold 2.

As shown by (A) of FIG. 8, the inflated inner vacuum bags 3 may be aligned on a curved surface of the lower mold 2. Then, the sheet-like material M of which both surfaces have been preferably covered with the sheets 20 made of PTFE or the like can be placed on the inner vacuum bags 3, and subsequently the atmosphere side of the material M can be bagged with the outer vacuum bag 4.

Then, as shown by (B) and (C) of FIG. 8, the inner vacuum bags 3 can be evacuated into the deflate state sequentially at different timing. Accordingly, the material M can be gradually pressed to the surface of the lower mold 2 while changing a shaping position of the material M. As a result, rapid deformation of the material M can be prevented, and thereby generating of disorder and wrinkle can be reduced.

Note that, FIG. 8 shows an example of a case where the material M is pressed to the concavely curved surface of the lower mold 2 by arranging the three inner vacuum bags 3 on the concavely curved surface of the lower mold 2, subsequently deflating the central inner vacuum bag 3, and further subsequently deflating the two inner vacuum bags 3 in both sides. As a matter of course, the inner vacuum bags 3 may be sequentially deflated from the inner vacuum bag 3 in one end side toward the inner vacuum bag 3 in the other end side.

As a matter of course, a preform having a rugged surface may be shaped although a degree of the curvature of the preform in the example shown in FIG. 8 is relatively gentle. As a concrete example, even a preform, having a structure with a steep edge in the vertical direction, for which it is difficult to laminate fiber sheets or prepregs with an automatic laminating device, can be shaped.

Fifth Implementation

FIG. 9 is a view for explaining a preform shaping method using a preform shaping apparatus according to the fifth implementation of the present invention.

A method of shaping a preform using a preform shaping apparatus 1D in the fifth implementation shown in FIG. 9 is different from the method of shaping a preform using the preform shaping apparatus 1 in the first implementation in a point that a pressurizing jig 9A for pressing the material M, before shaping a preform, to the lower mold 2 at different positions and timing is composed of a rigid upper mold 60 and closed pressure bags 62. Since other structures and actions in the fifth implementation are not substantially different from those in the first implementation, explanation for the same or corresponding elements is omitted with attaching the same signs.

As shown in FIG. 9, the pressure may be also applied on the material M by pressing the rigid upper mold 60 to the material M without utilizing the atmospheric pressure. In this case, the outer vacuum bag 4 used as an element of the pressurizing jig 9 in order to apply the atmospheric pressure in the first implementation is not used as an element of the pressurizing jig 9A in the fifth implementation. Moreover, in place of the inner vacuum bags 3 which are evacuated at the time of shaping the material M, the pressure bags 62 which are inflated by injecting air at the time of shaping the material M are used as elements of the pressurizing jig 9A in the fifth implementation.

Specifically, as shown by (A) of FIG. 9, the unshaped material M can be placed on the convex portions 2A of the lower mold 2. Subsequently, the deflated pressure bags 62 can be placed on the unshaped material M. The respective pressure bags 62 have shapes which fit to the concave portions of the lower mold 2 respectively once air has been injected inside the pressure bags 62. Moreover, the respective pressure bags 62 are placed at positions opposed to the corresponding concave portions across the material M respectively.

Then, the upper mold 60 having a flat surface can be pressed to the material M on which the deflated pressure bags 62 have been placed. In other words, the deflated pressure bags 62 each having a closed bag structure can be placed at different positions between the material M and the additional rigid upper mold 60 for sandwiching the material M with the lower mold 2.

The upper mold 60 can be moved in the vertical direction with a moving structure 61, such as a general purpose pressing machine, for example. Note that, the upper mold 60 may be fixed while the lower mold 2 may be moved with an elevator or the like since the atmospheric pressure is not used.

Then, as shown by (B), (C) and (D) of FIG. 9, the pressure bags 62 can be inflated sequentially at different timing in a state where the material M has been held between the lower mold 2 and the upper mold 60. Consequently, the material M can be pressed on the lower mold 2 at different positions and timing by forces applied on the material M from the pressure bags 62 at different timing. An order of inflating the pressure bags 62 can be determined similarly to an order of deflating the inner vacuum bags 3 in the first implementation. That is, an order of inflating the pressure bags 62 can be determined so that the material M may not be pulled to both sides across each convex portion 2A.

A tube 62A can be attached to each pressure bag 62, similarly to each inner vacuum bag 3. Each tube 62A can be coupled to a common pipe 63 through the cock 8. Thereby, the pressure bags 62 can be inflated by injecting air into their insides using a common air supply device 64 at different timing by opening and closing the cock 8. As a matter of course, the air supply devices 64 may be coupled to the respective pressure bags 62 separately.

When the material M is deforming toward each concave portion of the lower mold 2, it slides to the lower mold 2 and the upper mold 60. Therefore, also when the pressurizing jig 9A is composed of the rigid upper mold 60 and the pressure bags 62, covering both surfaces of the material M with the sheets 20 made of PTFE or the like makes it possible to slide the material M smoothly. In addition, disorder of the fibers can also be prevented.

Also in the case where the pressurizing jig 9A is composed of the rigid upper mold 60 and the pressure bags 62, it is possible to mold a composite material by an RTM method. When a composite material is molded by the RTM method using the preform shaping apparatus 1D, what is necessary is to install at least one injecting pipe 65, for injecting resin into a shaped dry preform, in the lower mold 2, the upper mold 60 or an end part of the dry preform while coupling at least one pipe 66 for vacuuming to the lower mold 2. In the example shown in FIG. 9, the injecting pipes 65 for injecting the resin have been embedded in portions of the upper mold 60 for pressing the fibers on the convex portions 2A of the lower mold 2 respectively so that the resin may certainly permeate respective mountain portions of the corrugated dry preform where it is important to spread the resin. Meanwhile, the pipes 66 which open in the concave portions of the lower mold 2 respectively have been coupled to a vacuum device 67.

As a matter of course, a laminated body of prepregs can be used as the material M, and a composite material can be molded by thermally curing a shaped preform with an oven, an autoclave apparatus or the like. In that case, the preform shaping apparatus 1D can be used as a device for thermally curing the composite material.

According to the above-mentioned fifth implementation, a preform having a complicated shape with concavity and convexity, such as a corrugated preform, can be shaped with high quality, using the upper mold 60 having a simple structure without concavity and convexity.

Note that, the rigid plates 50 as explained in the second implementation may be used in the fifth implementation. Specifically, the plate 50 can be interposed between each pressure bag 62 and the material M. Thereby, the material M can be deformed along the corners formed in the concave portions of the lower mold 2 more certainly. Moreover, the plurality of the pressure bags 62 may be placed between the adjacent two convex portions 2A of the lower mold 2, similarly to the third implementation. In this case, the pressure bags 62 can be inflated sequentially in an order similar to that in the third implementation. As a matter of course, also in a case where a curved panel-shaped preform is shaped as described in the fourth implementation, the preform can be shaped by disposing the pressure bags 62 on the lower mold 2 having a curved surface, and sequentially inflating the pressure bags 62 between the lower mold 2 and the upper mold 60.

Sixth Implementation

FIG. 10 is a view for explaining a preform shaping method using a preform shaping apparatus according to the sixth implementation of the present invention.

A method of shaping a preform using a preform shaping apparatus 1E in the sixth implementation shown in FIG. 10 is different from the method of shaping a preform using the preform shaping apparatus 1 in the first implementation in a point that a pressurizing jig 9B for pressing the material M, before shaping a preform, to the lower mold 2 at different positions and timing is composed of separated rigid upper molds 70. Since other structures and actions in the sixth implementation are not substantially different from those in the first implementation, explanation for the same or corresponding elements is omitted with attaching the same signs.

As shown by (A) of FIG. 10, the material M can be placed on the lower mold 2, and subsequently the rigid upper molds 70 for applying pressures on the material M at different positions can be sequentially pressed to the material M at different timing as shown by (B), (C) and (D) of FIG. 10. Thereby, the material M can be pressed to the lower mold 2 at the different positions and timing. Each upper mold 70 has a shape fitting one of the concave portions of the lower mold 2. Therefore, the material M can be fitted to the respective concave portions of the lower mold 2.

The upper molds 70 can be respectively moved in the vertical direction by moving structures 71, such as general-purpose pressing machines, for example. Each moving structure 71 may be manually driven with switch operation by an operator, or automatically controlled by a controlling device 72, composed of electronic circuits or the like, as shown in FIG. 10.

An order of moving the upper molds 70 downward to depress the material M can be determined similarly to an order of deflating the inner vacuum bags 3 in the first implementation. Specifically, an order of depressing the upper molds 70 toward the concave portions of the lower mold 2 can be determined so that the material M may not be pulled to both sides across each convex portion 2A.

When the material M is deforming toward each concave portion of the lower mold 2, it slides to the convex portions 2A of the lower mold 2. Therefore, inserting the sheet 20 made of PTFE or the like between the material M and the lower mold 2 makes it possible to slide the material M to the lower mold 2 smoothly. In addition, disorder of the fibers can also be prevented.

Also in the case where the pressurizing jig 9A is composed of the rigid upper mold 60 and the pressure bags 62, it is possible to mold a composite material by an RTM method. When a composite material is molded by the RTM method using the preform shaping apparatus 1D, what is necessary is to install at least one injecting pipe 65, for injecting resin into a shaped dry preform, in the lower mold 2, the upper mold 60 or an end part of the dry preform while coupling at least one pipe 66 for vacuuming to the lower mold 2. In the example shown in FIG. 9, the injecting pipes 65 for injecting the resin have been embedded in portions of the upper mold 60 for pressing the fibers on the convex portions 2A of the lower mold 2 respectively so that the resin may certainly permeate respective mountain portions of the corrugated dry preform where it is important to spread the resin. Meanwhile, the pipes 66 which open in the concave portions of the lower mold 2 respectively have been coupled to a vacuum device 67.

As a matter of course, a laminated body of prepregs can be used as the material M, and a composite material can be molded by thermally curing a shaped preform with an oven, an autoclave apparatus or the like. In that case, the preform shaping apparatus 1E can be used as a device for thermally curing the composite material.

According to the above-mentioned sixth implementation, a preform having a complicated shape with concavity and convexity, such as a corrugated preform, can be shaped with more satisfactory quality. Moreover, labor of operators and labor time can be reduced since setting closed bladder bags and bagging work with a bagging film become unnecessary.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the shape of the methods and systems described herein may be made without departing from the spirit of the invention. The accompanying claims and their equivalents are intended to cover such forms or modifications as would fall within the scope and spirit of the invention.

What is claimed is:

1. A method of shaping a preform comprising:
producing the shaped preform by pressing an unshaped material of the preform to a rigid mold at different positions and different timings, the rigid mold having a shape corresponding to a shape of the preform, and the rigid mold comprising a plurality of spaced apart projections and a plurality of concavities positioned such that pairs of adjacent projections have one of the concavities positioned therebetween; and
using a pressurizing jig for pressing the material, the pressurizing jig being adapted to apply pressures on the material at the different positions and the different timings,
wherein, in pressing the unshaped material, the material of the preform goes from an initial process state where a first mold side surface region is not in a shape corresponding to the shape of the preform to a subsequent state where the first mold side region is reconfigured by the pressurizing jig to assume the shape of the preform, and wherein applying pressures on the material at the different positions and the different timings includes pressing the material into concavities located between the respective pairs of adjacent projections in a sequence that avoids the material stretching across any of the projections, and wherein the pressurizing jig includes jig devices that are respectively centered at a center of an associated receiving one of the concavities such that operation of the jig devices results in a center region of an extending portion of the material, extending between an associated one of the pair of projections, stopping at a center region of the corresponding concavity, and wherein during the time one of the jig devices is pressurizing the material into a receiving one of the concavities, each immediately adjacent jig device has either completed or not yet started pressurizing the material into a receiving one of the concavities,
wherein the jig devices operate to shape the material during a state of vacuum generation that induces material shaping,
wherein the jig devices change shape or position to further induce material shaping, and wherein the sequence initiates in a middle concavity and works outward such that the free edging of the material is drawn inward in sequence toward the center in conjunction with the sequenced pressing by the pressurizing jig, and
wherein the jig devices include one or a set of inner vacuum bags respectively positioned within the concavities as well as rigid plates positioned above the material and respectively positioned above concavities having the one or a set of the inner vacuum bags, and the material is pressed to the mold by deflating the one or a set of inner vacuum bags while the material is both subject to pressing by the state of vacuum generation and a pressing by a respective one of the rigid plates that is associated with the one or set of inner vacuum bags being deflated within the receiving concavity.

2. The method of shaping the preform according to claim 1, wherein the shaped preform is a dry preform or a laminated body of prepregs, having a curved structure or concave portions.

3. The method of shaping the preform according to claim 1, wherein the shaped preform is a corrugated dry preform or a corrugated laminated body of prepregs.

4. The method of shaping the preform according to claim 1, wherein a sheet for sliding the material to the mold is disposed at least between the material and the mold.

5. The method of shaping the preform according to claim 2, wherein thermoplastic binder is placed between layers of a laminated body of fiber sheets used as a material of the dry preform, and the dry preform is shaped with heating and melting the thermoplastic binder.

6. The method of shaping the preform according to claim 2, wherein fiber sheets including Z-threads bearing strength in a thickness direction of the dry preform is used as a material of the dry preform, and the dry preform is shaped without thermoplastic binder and heating.

7. The method of shaping the preform according to claim 1, wherein the one or set of inner vacuum bags are arranged as to be symmetric, along a common direction of extension as the portion of the material extending between the pair of projections, relative to the center of the associated receiving concavity.

8. The method of shaping the preform according to claim 1, wherein each jig device has a material support or contact surface region that extends entirely horizontal and parallel with a full length of the portion of the material extending between the pair of projections.

9. The method of shaping the preform according to claim 1, wherein the state of vacuum generation that induces material shaping is carried out with an outer vacuum bag that, in combination with the rigid mold, encompasses all of the jig devices.

10. The method of shaping the preform according to claim 1, wherein the different positioning and timing includes a sequenced formation of corrugation shaped material projections and concave surfaces in the material that entails formation with the pressurizing jig of an initial single center corrugation shaped concave surface followed by a simultaneous formation of a pair of corrugation shaped concave surfaces to the left and right of the single center corrugation shaped concave surface.

11. The method of shaping the preform according to claim 10, wherein after the simultaneous formation of the pair of corrugation shaped concave surfaces to the left and right of the single center corrugation shaped concave surface, a next outer left and right pair of corrugation shaped concave surfaces are simultaneously formed.

12. The method of shaping the preform according to claim 1, wherein the sequence initiates by way of deflation of the one or a set of inner vacuum bags positioned in a middle concavity and works symmetrically outward such that the free edging of the material positioned to opposite sides of the middle concavity is simultaneously drawn toward the center in a sequence that conforms with the sequence of deflation of the inner vacuum bags.

13. The method of shaping the preform according to claim 12, wherein the material is supported by exterior most positioned jig devices as to provide for the sequenced material free edge inward adjustment on the support or contact surfaces of those exterior most positioned jig devices.

14. A method of producing a composite material structure comprising:
placing core jigs on a laminated body of prepregs for a panel and placing the corrugated dry preform, produced by the method according to claim 3, on the placed core jigs, the laminated body of the prepregs for the panel being placed on a lower rigid mold, the core jigs corresponding to a shape of the corrugated dry preform;
impregnating the corrugated dry preform with uncured thermosetting resin by injecting the uncured thermosetting resin into an area sealed by a vacuum bag in a state where the corrugated dry preform placed on the core jigs has been bagged with the vacuum bag; and
producing the composite material structure having the panel and a corrugated reinforcing member attached to the panel, by thermally curing the laminated body of the prepregs for the panel and the thermosetting resin with which the corrugated dry preform has been impregnated.

15. A method of producing a composite material structure comprising:
molding a corrugated composite material, the corrugated dry preform or the corrugated laminated body of the prepregs, produced by the method according to claim 3, being used as a material of the corrugated composite material;
producing a panel made of another composite material; and
producing the composite material structure having the panel and a corrugated reinforcing member attached to the panel, by assembling the corrugated composite material to the panel.

16. A method of shaping a preform comprising:
producing the shaped preform by pressing an unshaped material of the preform to a rigid mold at different positions and different timings, the rigid mold having a shape corresponding to a shape of the preform, and the rigid mold comprising a plurality of spaced apart projections and a plurality of concavities positioned such that pairs of adjacent projections have one of the concavities positioned therebetween; and
using a pressurizing jig for pressing the material, the pressurizing jig being adapted to apply pressures on the material at the different positions and the different timings, and further comprising:
respectively disposing closed inner vacuum bags on positions, corresponding to the different positions, between the mold and the material; and
sealing, with an outer vacuum bag, the material, on which the inner vacuum bags have been disposed, from an outside of the inner vacuum bags and the material,
wherein the material is pressed to the mold using an atmospheric pressure, by evacuating an area sealed by the outer vacuum bag and evacuating insides of the inner vacuum bags at the different timings such that, at a common time, one or more of the inner vacuum bags are in a contracted state and one or more of the inner vacuum bags are in an expanded state;
wherein the shaped preform is a dry preform or a laminated body of prepregs, having concave portions, and disposing rigid plates between the material and the outer vacuum bag in order to prevent gaps from being generated between the material and the rigid mold, the rigid plates having shapes corresponding to shapes of concave portions respectively; and
wherein applying pressures on the material at the different positions and the different timings includes pressing the material into concavities located between the respective pairs of adjacent projections in a sequence that avoids the material stretching across any of the projections, and wherein the inner vacuum bags are respectively centered at a center of an associated receiving one of the concavities such that operation of the pressurizing jig results in a center region of an extending portion of the material, extending between an associated one of the pair of projections, stopping at a center region of the corresponding concavity, and wherein during the time one of the inner vacuum bags is reconfiguring to place the material into a receiving one of the concavities, each immediately adjacent one of the concavities has yet had the material reconfigured to extend therein or reconfiguring of the material has already been completed for that adjacent concavity,
and wherein the inner vacuum bags operate to shape the material during a state of vacuum generation by the outer vacuum bag on the material that induces material shaping while allowing for material edge sequenced inward shifting during each sequence of pressurizing jig operation.

17. A method of shaping a preform comprising:
producing the shaped preform by pressing an unshaped material of the preform to a rigid mold at different positions and different timings, the rigid mold having a shape corresponding to a shape of the preform, and the rigid mold comprising a plurality of spaced apart projections and a plurality of concavities positioned such that pairs of adjacent projections have one of the concavities positioned therebetween; and using a pressurizing jig for pressing the material, the pressurizing jig being adapted to apply pressures on the material at the different positions and the different timings, wherein the pressurizing jig includes a plurality of preform shape forming vacuum bags that respectively go from an initial expanded state to a fully collapsed state, at the different positions and different timings, and wherein, in the fully collapsed state, each preform shape forming vacuum bag, is compressed in-between the preform and the rigid mold, and wherein applying pressures on the material at different positions and different timings includes pressing the material into concavities located between the respective pairs of adjacent projections in a sequence that avoids the material stretching across any of the projections, and wherein the preform shape forming vacuum bags are respectively centered at a center of an associated receiving one of the concavities such that operation of the pressurizing jig results in a center region of an extending portion of the material, extending between an associated one of the pair of projections, stopping at a center region of the corresponding concavity, and wherein during the time one of the preform shape forming vacuum bags is reconfiguring to place the material into a receiving one of the concavities, each immediately adjacent one of the concavities has yet had the material reconfigured to extend therein or reconfiguring of the material has already been completed for that adjacent concavity, and wherein the sequence initiates in a middle concavity and works outward such that the free edging of the material is drawn inward in sequence toward the center in conjunction with the sequenced pressing by the pressurizing jig.

18. The method of shaping the preform according to claim 17, further comprising sealing, with an outer vacuum bag, the material, on which the preform shape forming vacuum bags have been disposed, from an outside of the preform shape forming vacuum bags and the material, and wherein the preform shape forming vacuum bags operate to shape the material during a state of vacuum generation by the outer vacuum bag that induces material shaping while allowing for material edge sequenced inward shifting during each sequence of pressurizing jig operation.

19. The method of shaping the preform according to claim 18, further comprising rigid plates positioned above the material and below the outer vacuum bag, and the rigid plates being respectively positioned above concavities having the preform shape forming vacuum bags, and wherein the material is pressed to the mold by deflating the preform shape forming vacuum bags while the material is both subject to a downward pressing by the state of vacuum generation by the outer vacuum bag and a downward pressing by a respective one of the rigid plates that is associated with the preform shape forming vacuum bags being deflated within the receiving concavity.

* * * * *